(12) United States Patent
Chu et al.

(10) Patent No.: US 12,495,325 B2
(45) Date of Patent: Dec. 9, 2025

(54) DEVICE, METHOD, AND SYSTEM FOR TRANSMITTING LOW LATENCY TRAFFIC

(71) Applicant: NXP USA, Inc., Austin, TX (US)

(72) Inventors: Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 479 days.

(21) Appl. No.: 17/987,579

(22) Filed: Nov. 15, 2022

(65) Prior Publication Data

US 2023/0156516 A1 May 18, 2023

Related U.S. Application Data

(60) Provisional application No. 63/267,648, filed on Feb. 7, 2022, provisional application No. 63/264,169, filed on Nov. 16, 2021.

(51) Int. Cl.
*H04W 28/02* (2009.01)
*H04W 52/02* (2009.01)

(52) U.S. Cl.
CPC ... *H04W 28/0268* (2013.01); *H04W 52/0258* (2013.01)

(58) Field of Classification Search
CPC .................. H04W 28/0268; H04W 52/0258
See application file for complete search history.

(56) References Cited

U.S. PATENT DOCUMENTS

| | | | |
|---|---|---|---|
| 2022/0240264 A1* | 7/2022 | Chu | H04W 12/06 |
| 2023/0024093 A1* | 1/2023 | Hsu | H04W 28/24 |
| 2023/0047109 A1* | 2/2023 | Hsu | H04L 47/2441 |
| 2023/0058871 A1* | 2/2023 | Xin | H04W 72/56 |

OTHER PUBLICATIONS

U.S. Appl. No. 63/237,556 (Year: 2021).*
U.S. Appl. No. 63/260,173 (Year: 2021).*

* cited by examiner

*Primary Examiner* — Afshawn M Towfighi (57) ABSTRACT

Embodiments of a device, a method, and a system for transmitting low latency traffic are disclosed. In an embodiment, the device includes a wireless network interface device implemented on one or more integrated circuits (ICs), where the wireless network interface device is configured to negotiate a Stream Classification Service (SCS) for multiple links, and exchange frames on the multiple links according to the negotiated SCS.

19 Claims, 8 Drawing Sheets

DEVICE, METHOD, AND SYSTEM FOR TRANSMITTING LOW LATENCY TRAFFIC

CROSS-REFERENCE TO RELATED APPLICATIONS

This application is entitled to the benefit of U.S. Provisional Patent Application Ser. No. 63/264,169, filed on Nov. 16, 2021, and U.S. Provisional Patent Application Ser. No. 63/267,648, filed on Feb. 7, 2022, which are incorporated by reference herein.

BACKGROUND

In wireless communications, wireless devices, e.g., multi-link devices (MLDs), can execute various multi-link operations, such as transmission and reception of frames via one or more communication links. As an example, a non-access point (non-AP) MLD and an access point (AP) MLD may exchange frames to establish a Stream Classification Service (SCS). In an SCS negotiation, the non-AP MLD may request traffic characteristics and the AP MLD may determine whether to accept the requested traffic characteristics. Consequently, the AP MLD may not be able to indicate whether some or all of the requested traffic characteristics were accepted. Further, SCS negotiations may not be defined for peer-to-peer (P2P) communications systems. As such, conventional SCS negotiation techniques may be inefficient, which may cause wireless devices to experience restricted performance.

SUMMARY

Embodiments of a device, a method, and a system for transmitting low latency traffic are disclosed. In an embodiment, the device includes a wireless network interface device implemented on one or more integrated circuits (ICs), where the wireless network interface device is configured to negotiate a Stream Classification Service (SCS) for multiple links, and exchange frames on the multiple links according to the negotiated SCS.

In an embodiment, negotiation of the SCS for the multiple links includes requesting traffic characteristics via a Quality of Service (QoS) Characteristics element of an SCS Request frame, and where the QoS Characteristics element indicates links where peer-to-peer (P2P) traffic is requested, a medium time of the P2P traffic, and a bandwidth of the links where the P2P traffic is requested.

In an embodiment, negotiation of the SCS for the multiple links includes requesting traffic characteristics via a QoS Characteristics element of an SCS Request frame, and receiving an SCS Response frame that indicates whether the requested traffic characteristics were accepted.

In an embodiment, negotiation of the SCS for the multiple links includes requesting traffic characteristics via a QoS Characteristics element of an SCS Request frame, and receiving an SCS Response frame, where the SCS Response frame indicates that the requested traffic characteristics were accepted.

In an embodiment, the SCS Response frame indicates accepted traffic characteristics via a QoS Characteristics element of the SCS Response frame.

In an embodiment, the QoS Characteristics element of the SCS Response frame indicates at least one of a link bitmap of P2P traffic for a requested link and an updated service interval.

In an embodiment, negotiation of the SCS for the multiple links includes requesting traffic characteristics via a QoS Characteristics element of an SCS Request frame, and receiving an SCS Response frame, where the SCS Response frame indicates that the requested traffic characteristics were rejected.

In an embodiment, the SCS Response frame indicates suggested traffic characteristics via a QoS Characteristics element of the SCS Response frame when the requested traffic characteristics are rejected.

In an embodiment, a link bitmap included in at least one of a QoS Characteristics element and an SCS Descriptor element that is transmitted during the SCS negotiation indicates links being used for negotiated traffic.

In an embodiment, the device negotiates restricted Target Wake Time (rTWT) parameters in an rTWT negotiation according to the negotiated SCS.

In an embodiment, a Target Wake Time (TWT) element transmitted in the rTWT negotiation includes an SCS identifier (ID) (SCSID) that indicates a traffic stream whose frames are serviced in an rTWT service period (SP).

In an embodiment, a TWT element transmitted in the rTWT negotiation includes an SCS Descriptor element that indicates a traffic stream whose frames are serviced in an rTWT SP.

In an embodiment, a Service Start Time is defined by a timing synchronization function (TSF) time of a link where an SCS Request frame is transmitted during the SCS negotiation.

In an embodiment, a Service Start Time is defined by a link from the multiple links of the negotiated SCS with at least one of a smallest TSF time and a largest TSF time.

In an embodiment, a Service Start Time is defined by a TSF time of a link from the multiple links of the negotiated SCS with at least one of a smallest Link ID and a largest Link ID.

In an embodiment, the device exchanges the frames in a traffic stream, and where a TWT of the traffic stream and a Service Start Time of the traffic stream are the same.

In an embodiment, the device exchanges the frames in a traffic stream, and where a TWT of the traffic stream is before a Service Start Time of the traffic stream.

In an embodiment, the device exchanges the frames in a traffic stream, and where a TWT of the traffic stream is after a Service Start Time of the traffic stream.

A method for transmitting low latency traffic is also disclosed. In an embodiment, the method includes negotiating an SCS for multiple links, and exchanging frames on the multiple links according to the negotiated SCS.

A system for transmitting low latency traffic is also disclosed. In an embodiment, the system includes a first multi-link device (MLD) configured to transmit an SCS Request frame that requests traffic characteristics indicated in a QoS Characteristics element of the SCS Request frame, and a second MLD configured to receive the SCS Request frame, and transmit an SCS Response frame that indicates whether the requested traffic characteristics were accepted, where the SCS Response frame indicates accepted traffic characteristics via a QoS Characteristics element of the SCS Response frame.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-access point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

Figure 1:
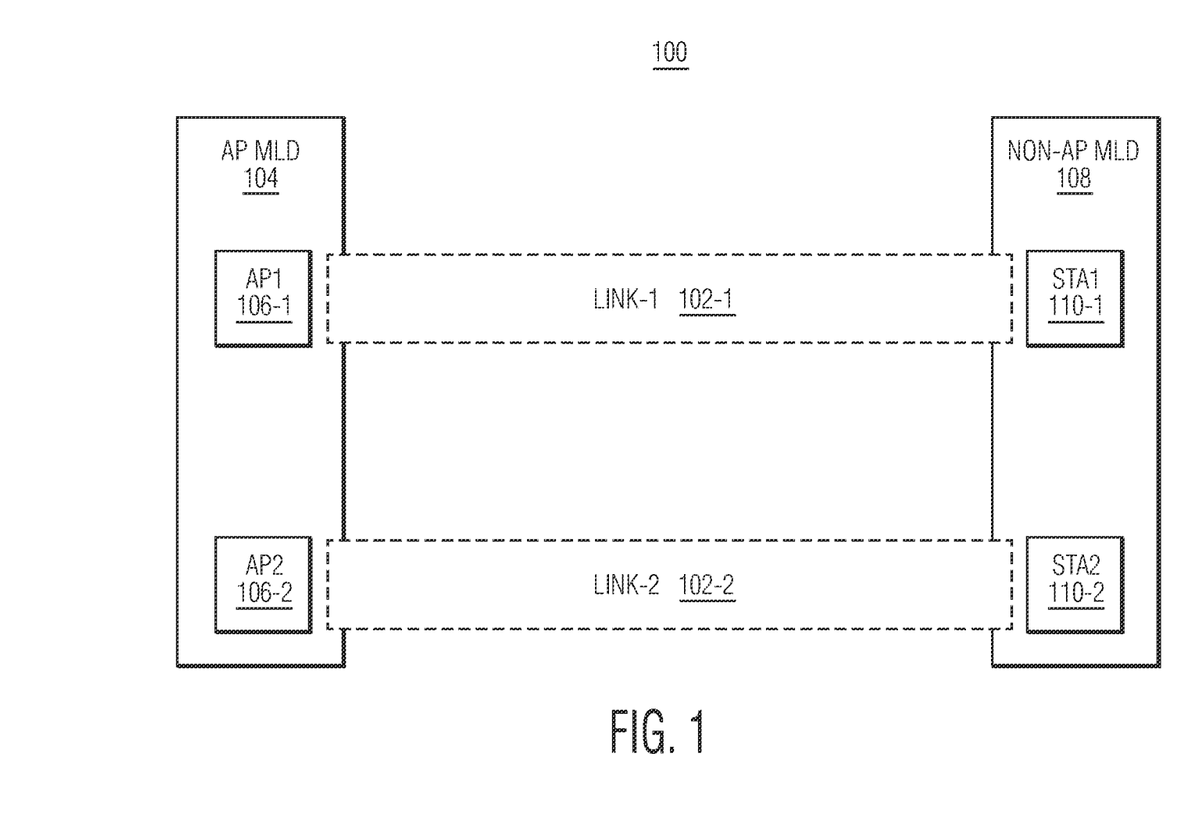
FIG. 1 depicts a multi-link communications system.

FIG. 1 depicts a multi-link communications system 100 that is used for wireless (e.g., Wi-Fi) communications. In the embodiment depicted in FIG. 1, the multi-link communications system includes one AP MLD, implemented as AP MLD 104, and one non-AP MLD (e.g., STA MLD), implemented as non-AP MLD 108. In an embodiment, the AP MLD 104 may be a first wireless device (e.g., first MLD), and the non-AP MLD 108 may be a second wireless device (e.g., second MLD). The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two APs working on two radios, AP1 106-1 and AP2 106-2. In some embodiments, a common part of the AP MLD 104 implements upper layer Media Access Control (MAC) functionalities (e.g., Beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device, such that the APs include a wireless network interface implemented on one more ICs. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a Local Area Network (LAN) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 megahertz (MHz) BSS operating channel at 6 gigahertz (GHz) band and AP2 106-2 may operate in a 160 MHz BSS operating channel at 5 GHz band. Although the AP MLD 104 is shown in FIG. 1 as including two APs, other embodiments of the AP MLD 104 may include more than two APs or less than two APs.

In the embodiment depicted in FIG. 1, the non-AP MLD, implemented as non-AP MLD 108, includes two STAs (e.g., non-AP STAs), STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device, such that the STAs include a wireless network interface device implemented on one or more ICs. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface. Although the non-AP MLD 108 is shown in FIG. 1 as including two STAs, other embodiments of the non-AP MLD 108 may include one STA or more than two STAs.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, implemented as link 1 102-1 and link 2 102-2. For example, each of the STAs 110-1 or 110-2 communicates with AP1 106-1 or AP2 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames in Physical Layer Convergence Procedure (PLCP) Protocol Data Units (PPDUs) (e.g., Date frames, Control frames, Management frames, Beacon frames, Action frames, etc.) between an AP MLD and a non-AP MLD. The PPDUs may be transmitted at signal bandwidths of, for example, 80 MHz, 160 MHz, or 320 MHz, and may include 20 MHz channels (sometimes referred to as "units"). In some embodiments, a 20 MHz channel may be a punctured 20 MHz channel (sometimes referred to as a "punctured channel" or a "punctured unit") or an unpunctured 20 MHz channel (sometimes referred to as an "unpunctured channel" or an "unpunctured unit). Similar channels or units of a PPDU may be aggregated to form larger units (sometimes referred to as "segments"). For example, two unpunctured channels may be aggregated to form one unpunctured segment with a bandwidth of 40 MHz. Although the AP MLD 104 communicates (e.g., wirelessly communicates) with the non-AP MLD 108 via links 102-1 and 102-2, in other embodiments, the AP MLD 104 may communicate (e.g., wirelessly communicate) with the non-AP MLD 108 via more than two communication links or less than two communication links.

The multi-link communications system 100 may negotiate a Stream Classification Service (SCS) for multiple links. In the SCS negotiation, non-AP MLD 108 transmits an SCS Request frame to AP MLD 104. The SCS Request frame includes requested traffic characteristics. AP MLD 104 then decides whether to accept the requested traffic and transmits an SCS Response frame to non-AP MLD 108. However, the SCS Response frame may not include an update of the requested traffic characteristics in a Quality of Service (QoS) Characteristics element of the SCS Response frame. Consequently, AP MLD 104 may not be able to accept or reject the requested traffic characteristics and indicate, in the QoS Characteristics element of the SCS Response frame with updated parameters, whether the requested traffic characteristics were accepted or rejected. Further, techniques for defining fields included in the QoS Characteristics element of the SCS Request frame and/or the SCS Response frame may not be defined. SCS for multiple links in a peer-to-peer (P2P) communications system may also not be defined.

In accordance with an embodiment of the invention, a device includes a wireless network interface device implemented on one or more ICs, wherein the wireless network interface device is configured to negotiate an SCS for multiple links, and exchange frames on the multiple links according to the negotiated SCS. In an embodiment, negotiation of the SCS for the multiple links includes exchanging an SCS Request frame and an SCS Response frame which include QoS Characteristics elements that indicate requested traffic characteristics and/or accepted traffic characteristics. By indicating the requested traffic characteristics and/or the accepted traffic characteristics in the QoS Characteristics elements of the SCS Request frame and the SCS Response frame, the device can determine whether the requested traffic characteristics were accepted and/or rejected. In addition, the SCS negotiation may be supported by P2P communication systems. As such, wireless communication systems may be able to operate more efficiently, and may experience an improvement in overall performance.

As described herein, "SCS" may be defined as a service which allows classification of traffic streams (e.g., according to Access Categories (ACs)), application of rules to the traffic streams (e.g., specific QoS treatment), prioritization of transmissions in the traffic streams (e.g., via transmission queues), and the like. As an example, the SCS may be negotiated for multiple links. Once the SCS has been negotiated (e.g., when a negotiated SCS has been established), a device may exchange frames according to the negotiated SCS, such that the frames are exchanged using traffic characteristics of the negotiated SCS. To negotiate the SCS, a first device (e.g., a non-AP MLD or an AP MLD) and a second device (e.g., an AP MLD) may exchange an SCS Request frame and an SCS Response frame. When the SCS Request frame with QoS Characteristics elements of a non-AP MLD is accepted by an associated AP MLD, the AP MLD will allocate enough resources (e.g., allocate enough medium time with an appropriate Modulation and Coding Scheme (MCS), number of spatial streams (Nss), and/or bandwidth) to satisfy a frame transmission requirement of the non-AP MLD.

As described herein, "negotiate" may imply a first device (e.g., an AP MLD or a non-AP MLD) requesting traffic characteristics (e.g., a parameter or set of parameters) from a second device (e.g., an AP MLD or a non-AP MLD), the second device rejecting and/or accepting some or all of the requested traffic characteristics, and the second device indicating to the first device, the accepted traffic characteristics from the requested traffic characteristics. In some embodiments, the first device and the second device may perform several "negotiations" to establish the accepted traffic characteristics. In one embodiment, the first device is a non-AP MLD, and the second device is an AP MLD, such that the non-AP MLD and the AP MLD are included in a multi-link communications system (e.g., multi-link communications system 100). In another embodiment, the first device is a first non-AP MLD, and the second device is a second non-AP MLD, such that the first non-AP MLD and the second non-AP MLD are included in a P2P communications system. An example of a P2P communications system is described in further detail with reference to FIG. 2.

Figure 2:
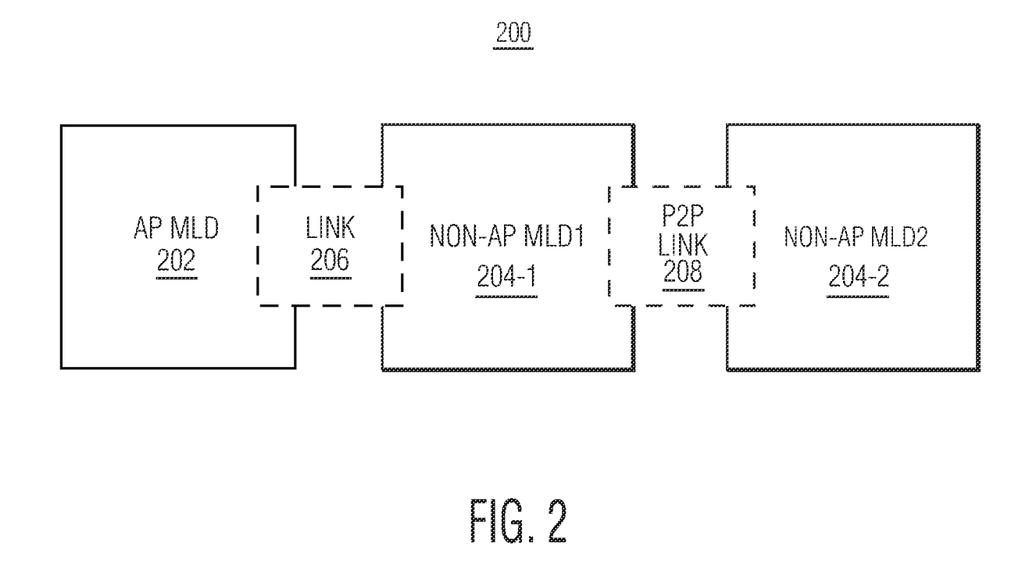
FIG. 2 depicts a peer-to-peer (P2P) communications system.

FIG. 2 depicts a P2P communications system 200. The P2P communications system 200 includes an AP MLD, a first non-AP MLD, and a second non-AP MLD, implemented as AP MLD 202, non-AP MLD1 204-1 and non-AP MLD2 204-2, respectively. AP MLD 202 may be as described with reference to AP MLD 104 (FIG. 1). Non-AP MLD1 204-1 and/or non-AP MLD2 204-2 may be as described with reference to non-AP MLD 108 (FIG. 1). In an embodiment, AP MLD 202 and non-AP MLD1 204-1 are connected by a link 206, which may be as described with reference to link 1 102-1 or link 2 102-2 (FIG. 1). In an embodiment, non-AP MLD1 204-1 and non-AP MLD2 204-2 are connected by a P2P link 208. The P2P link 208 may provide a connection via internet and/or a P2P network. Additionally, the P2P link 208 allows the non-AP MLDs to exchange frames and share data. Although not shown, the P2P communications system 200 may include more than two non-AP MLDs and more than one P2P link.

In some embodiments, a multi-link communications system (e.g., multi-link communications system 100) or a P2P communications system (e.g., P2P communications system 200) may negotiate an SCS for multiple links. An example of an SCS negotiation is described in further detail with reference to FIG. 3.

Figure 3:
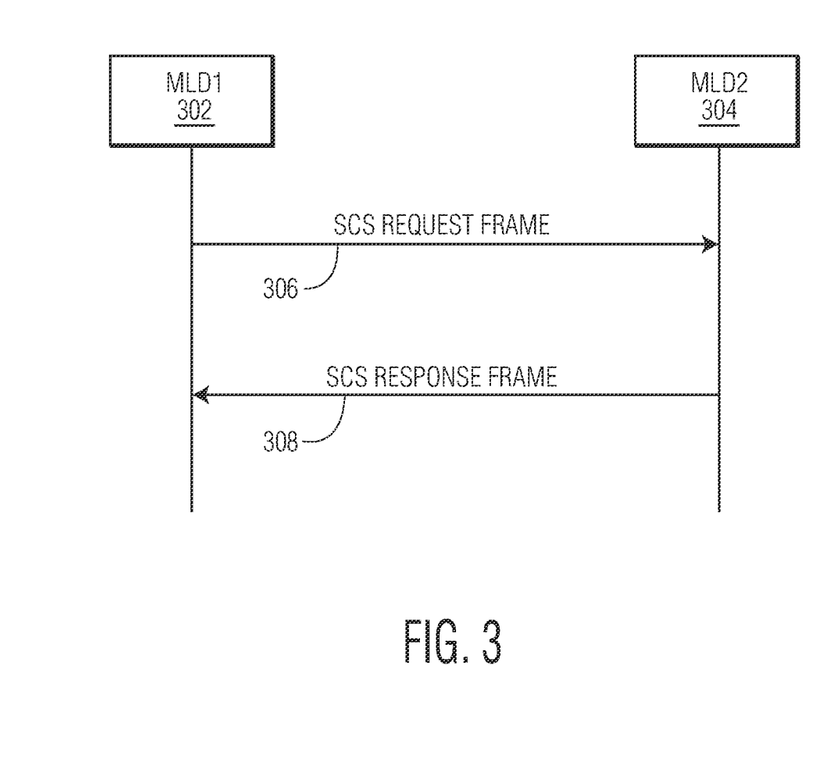
FIG. 3 illustrates a Stream Classification Service (SCS) negotiation.

FIG. 3 illustrates an SCS negotiation. In particular, a first MLD and a second MLD, implemented as MLD1 302 and MLD2 304, respectively, may negotiate an SCS for multiple links. As an example, MLD1 302 may be a non-AP MLD (e.g., non-AP MLD1 204-1 (FIG. 2)) and MLD2 304 may be an AP MLD (e.g., AP MLD 202 (FIG. 2)). In the SCS negotiation, MLD1 302 requests traffic characteristics by transmitting an SCS Request frame to MLD2 304 on a link (e.g., link 206 (FIG. 2)) at step 306. In an embodiment, the SCS Request frame includes a QoS Characteristics element that indicates links where P2P traffic is requested (e.g., P2P link 208 (FIG. 2)), a medium time of the P2P traffic, and a bandwidth of the links where the P2P traffic is requested. After MLD2 304 receives the SCS Request frame, MLD2 determines whether to accept the requested traffic characteristics. MLD2 304 then transmits an SCS Response frame to MLD1 302 on the link at step 308. In an embodiment, the SCS Response frame indicates whether the requested traffic characteristics were accepted. After MLD1 302 receives the SCS Response frame that indicates whether the requested traffic characteristics were accepted, MLD1 302 and MLD2 304 exchange frames on multiple links according to the negotiated SCS. Although not shown, MLD1 302 exchanges frames with another MLD (e.g., non-AP MLD2 204-2 (FIG. 2)) on the P2P link according to the negotiated SCS. In an embodiment, MLD2 304 allocates a resource to MLD1 302 for P2P frame exchanges between MLD1 302 and the other MLD.

In one embodiment, the SCS Response frame transmitted at step 308 indicates that the requested traffic characteristics were accepted. As an example, the SCS Response frame may indicate accepted traffic characteristics via a QoS Characteristics element of the SCS Response frame. In such an example, the QoS Characteristics element of the SCS Response frame indicates a link bitmap of P2P traffic for a requested link and/or an updated service interval.

In another embodiment, the SCS Response frame transmitted at step 308 indicates that the requested traffic characteristics were rejected. In such an embodiment, the SCS Response frame indicates suggested traffic characteristics via a QoS Characteristics element of the SCS Response frame when the requested traffic characteristics are rejected. When MLD1 302 receives the SCS Response frame that indicates the suggested traffic characteristics, MLD1 may transmit another SCS Request frame to MLD2 304, such that the SCS Request frame requests traffic characteristics according to the suggested traffic characteristics. MLD2 304 then determines whether to accept the requested traffic characteristics, and transmits another SCS Response frame to MLD1 302. In an embodiment, such a process may be repeated until MLD1 302 and MLD2 304 have established accepted traffic characteristics and have successfully negotiated the SCS for multiple links.

An example of an SCS Request frame, an SCS Response frame, and a QoS Characteristics element are described in further detail with reference to FIGS. 4-6.

Figure 4:
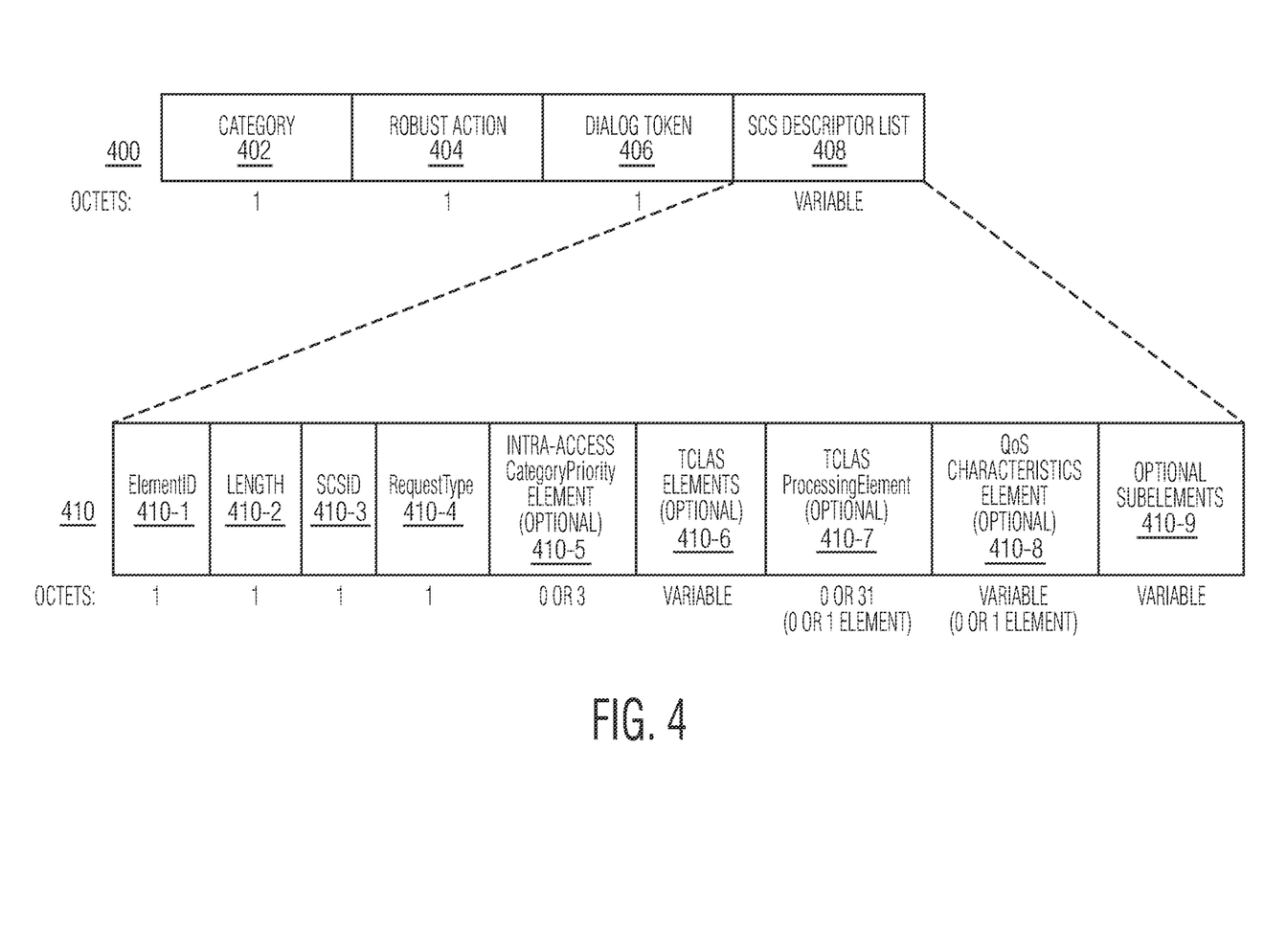
FIG. 4 depicts an example of an SCS Request frame.

FIG. 4 depicts an example of an SCS Request frame 400. The SCS Request frame 400 may represent the SCS Request frame transmitted by MLD1 302 at step 306 (FIG. 3). In an embodiment, the SCS Request frame 400 includes four fields, implemented as Category 402 (1 octet), Robust Action 404 (1 octet), Dialog Token 406 (1 octet), and SCS Descriptor List 408 (variable octets). In such an embodiment, the SCS Descriptor List 408 includes an SCS Descriptor element 410.

The SCS Descriptor element 410 includes nine subfields, implemented as Element ID (ElementID) 410-1 (1 octet), Length 410-2 (1 octet), Stream Classification Service Identifier (SCSID) 410-3 (1 octet), Request Type (RequestType) 410-4 (1 octet), Intra-Access Category Priority (CategoryPriority) Element (optional) 410-5 (0 or 3 octets), Traffic Classification (TCLAS) Elements (optional) 410-6 (variable octets), TCLAS Processing Element (ProcessingElement) (optional) 410-7 (0 or 31 octets) (0 or 1 element), QoS Characteristics element (optional) 410-8 (variable octets) (0 or 1 element), and Optional subelements 410-9 (variable octets).

Figure 5:
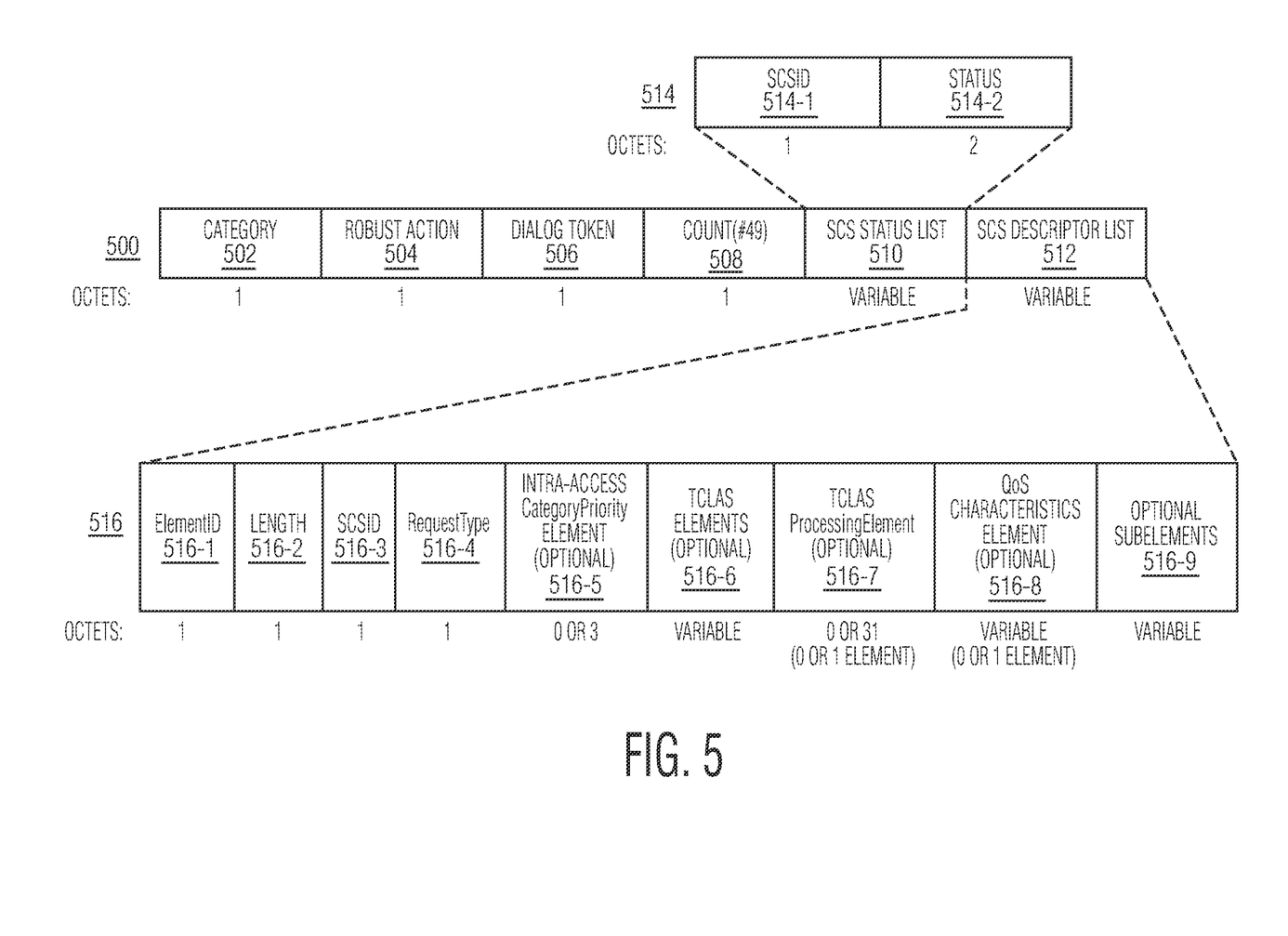
FIG. 5 depicts an example of an SCS Response frame.

FIG. 5 depicts an example of an SCS Response frame 500. The SCS Response frame 500 may represent the SCS Response frame received by MLD1 302 at step 308 (FIG. 3). In an embodiment, the SCS Response frame 500 includes six fields, implemented as Category 502 (1 octet), Robust Action 504 (1 octet), Dialog Token 506 (1 octet), Count 508 (1 octet), SCS Status List 510 (variable octets), and SCS Descriptor List 512 (variable octets). In such an embodiment, the SCS Status List 510 includes an SCS Status element 514 and the SCS Descriptor List 512 includes an SCS Descriptor element 516.

The SCS Status element 514 includes two subfields, implemented as SCSID 514-1 (1 octet) and Status 514-2 (2 octets).

The SCS Descriptor element 516 includes nine subfields, implemented as ElementID 516-1 (1 octet), Length 516-2 (1 octet), SCSID 516-3 (1 octet), RequestType 516-4 (1 octet), Intra-Access CategoryPriority element (optional) 516-5 (0 or 3 octets), TCLAS elements (optional) 516-6 (variable octets), TCLAS ProcessingElement (optional) 516-7 (0 or 31 octets) (0 or 1 element), QoS Characteristics element (optional) 516-8 (variable octets) (0 or 1 element), and Optional subelements 516-9 (variable octets).

In one embodiment, the SCS Descriptor element 516 is included in the SCS Response frame 500 when a device (e.g., an AP MLD or a non-AP MLD) rejects requested traffic characteristics of an SCS Request frame and wants to provide suggested traffic characteristics. In such an embodiment, the suggested traffic characteristics are included in the QoS Characteristics element 516-8 of the SCS Descriptor element 516.

In another embodiment, the SCS Descriptor element 516 is included in the SCS Response frame 500 when a device (e.g., an AP MLD) accepts requested traffic characteristics of an SCS Request frame. In such an embodiment, updated parameters may be included in the QoS Characteristics element 516-8 of the SCS Descriptor element 516. The updated parameters may be a link bitmap of a P2P link where the AP MLD may have accepted (only) some of the requested links.

In some embodiments, the AP MLD may indicate a service interval in the QoS Characteristics element 516-8 of the SCS Response frame 500 so that a non-AP MLD can use the indicated service interval to request a specific restricted Target Wake Time (rTWT). In one embodiment, the SCS Response frame 500 explicitly indicates the rTWT, such that the non-AP MLD that receives the SCS Response frame can join the rTWT. In another embodiment, the SCS Response frame 500 may indicate that a Service Start Time is a Target Wake Time (TWT) Wake Time of the rTWT, such that the AP MLD that receives the SCS Response frame 500 can join the rTWT.

Figure 6:
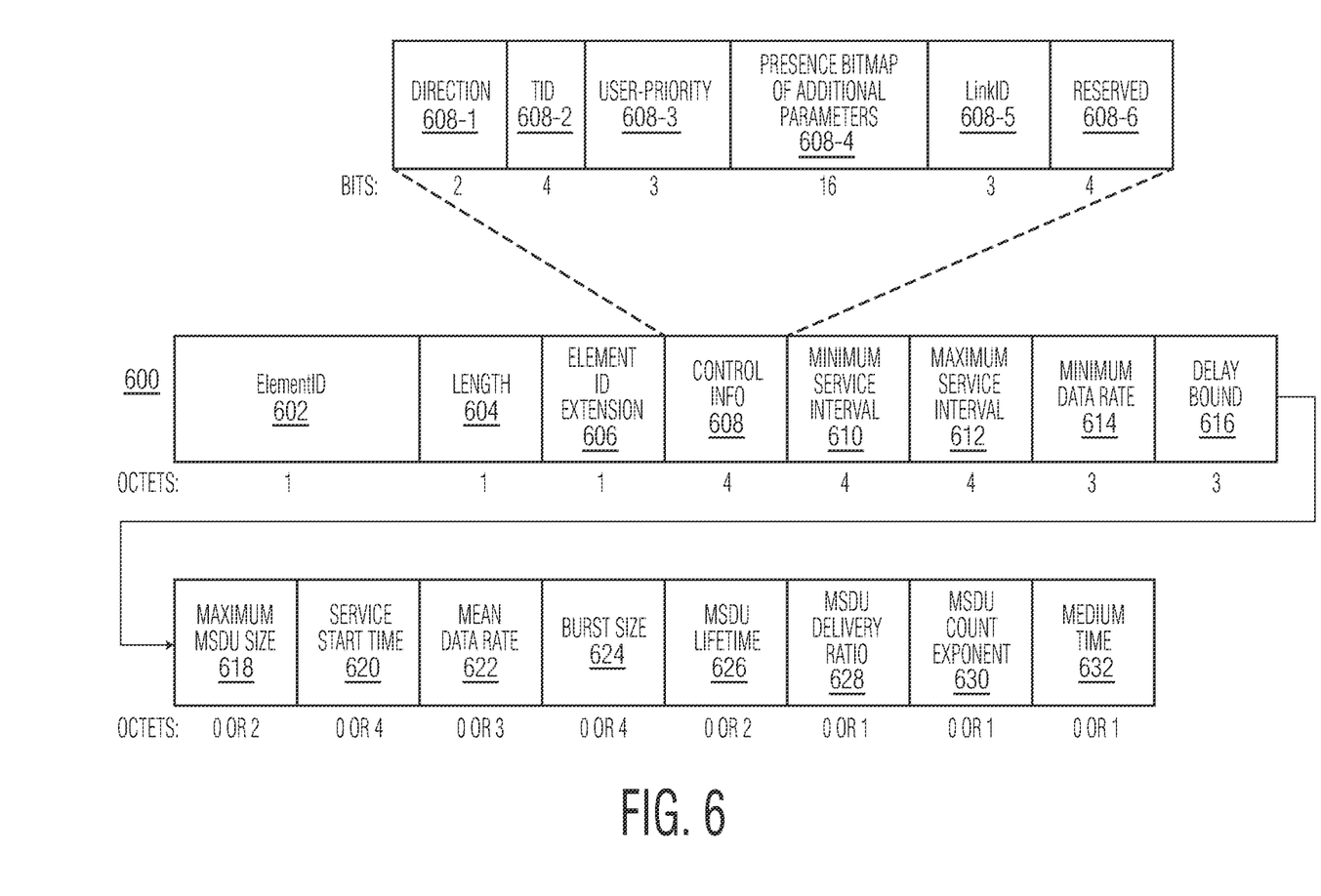
FIG. 6 depicts an example of a Quality of Service (QoS) Characteristics element.

FIG. 6 depicts an example of a QoS Characteristics element 600. The QoS Characteristics element may represent the QoS Characteristics element 410-8 included in the SCS Descriptor element 410 of the SCS Request frame 400 (FIG. 4) or the QoS Characteristics element 516-8 included in the SCS Descriptor element 516 of the SCS Response frame 500 (FIG. 5). In an embodiment, the QoS Characteristics element 600 includes sixteen fields, implemented as Element ID 602 (1 octet), Length 604 (1 octet), Element ID extension 606 (1 octet), Control Info 608 (4 octets), Minimum Service Interval 610 (4 octets), Maximum Service Interval 612 (4 octets), Minimum Data Rate 614 (3 octets), Delay Bound 616 (3 octets), Maximum MAC Service Data Unit (MSDU) Size 618 (0 or 2 octets), Service Start Time 620 (0 or 4 octets), Mean Data Rate 622 (0 or 3 octets), Burst Size 624 (0 or 4 octets), MSDU Lifetime 626 (0 or 2 octets), MSDU Delivery Ratio 628 (0 or 1 octet), MSDU Count Exponent 630 (0 or 1 octet), and Medium Time 632 (0 or 1 octet). In such an embodiment, the Control Info 608 includes six subfields, implemented as Direction 608-1 (2 bits), Traffic Identifier (TID) 608-2 (4 bits), User-Priority 608-3 (3 octets), Presence Bitmap of Additional Parameters 608-4 (16 octets), Link ID (LinkID) 608-5 (3 bits), and Reserved 608-6 (4 bits).

In some embodiments, the Presence Bitmap of Additional Parameters 608-4 is a link bitmap (e.g., an 8-bit bitmap or a 16-bit bitmap) that indicates links where P2P traffic is requested. As an example, the link bitmap may be added to the QoS Characteristics element 600 or the SCS Descriptor element 516 (FIG. 5). In such an example, the link bitmap is used to indicate links being used for negotiated down-link (DL) traffic and/or up-link (UL) traffic. In some embodiments, the Medium Time 632 indicates a medium time of the P2P traffic. For example, the medium time of the P2P traffic indicates a time under a specific reference bandwidth with a specific time interval. Examples of the reference bandwidth include a 20 MHz bandwidth, a maximal bandwidth amongst all links, and a smallest bandwidth amongst all links. In some embodiments, a bandwidth of each link is also announced by the QoS Characteristics element 600. As an example, the bandwidth is a maximal bandwidth allowed by a P2P link (e.g., P2P link 208 (FIG. 2)). In an embodiment, the medium time and the maximal bandwidth are announced for each link indicated in the link bitmap. In such an embodiment, the medium time and the maximal bandwidth of a link indicates the medium time being used under an announced maximal bandwidth when P2P traffic is transmitted using a link.

In some embodiments, a device (e.g., a non-AP MLD or an AP MLD) negotiates rTWT parameters in an rTWT negotiation according to a negotiated SCS. In one embodiment, the rTWT negotiation is before an SCS negotiation. In another embodiment, the rTWT negotiation is after the SCS negotiation.

In some embodiments, an rTWT service period (SP) may not be long enough to accommodate a new traffic stream of low latency traffic defined by the SCS negotiation. In addition, an update of rTWT parameters may also be needed for removing low latency traffic. As such, an AP MLD may update a TWT Wake Duration of the rTWT to accommodate the new traffic stream, such that the update may be defined as a critical update. Alternatively, the AP MLD can accept an SCS Request frame with an updated QoS Characteristics element that includes, e.g., a smaller Mean Data Rate, a smaller Medium Time, etc.

In one embodiment, a TWT element transmitted in the rTWT negotiation may include an SCS ID that indicates a traffic stream whose frames are serviced in an rTWT SP. For example, if the TWT element is included in a TWT Setup Request frame and/or a TWT Setup Response frame that is for the rTWT negotiation, then the TWT element carries the SCS ID(s) to indicate the traffic stream(s) whose frames will be serviced in the rTWT SP. In another embodiment, the TWT element transmitted in the rTWT negotiation includes an SCS Descriptor element that indicates the traffic stream whose frames are serviced in the rTWT SP. For example, if the TWT element is included in a TWT Setup Request frame and/or a TWT Setup Response frame that is for the rTWT negotiation, then the TWT element carries the SCS Descriptor element(s) to indicate the traffic stream(s) whose frames will be serviced in the rTWT SP.

In some embodiments, a start time of an rTWT agreement (e.g., TWT in a TWT element for an rTWT) for a traffic stream and a Service Start Time of the traffic stream is defined by a QoS Characteristics element (e.g., QoS Characteristics element 600). In one embodiment, the TWT of the traffic stream and the Service Start Time of the traffic stream are the same. In another embodiment, the TWT of the traffic stream is before the Service Start Time of the traffic stream. In yet another embodiment, the TWT of the traffic stream is after the Service Start Time of the traffic stream.

In some embodiments, an AP MLD (e.g., AP MLD 104 (FIG. 1)) may have different Time Synchronization Function (TSF) times, but a reference time of a Service Start Time may not be clear. As such, a reference TSF time may be used for the Service Start Time. In one embodiment, the Service Start Time is defined by a TSF time of a link where an SCS Request frame (e.g., SCS Request frame 400 (FIG. 4)) is transmitted during the SCS negotiation. In another embodiment, the Service Start Time is defined by a link from multiple links of a negotiated SCS with a smallest TSF time or a largest TSF time. In yet another embodiment, the Service Start Time is defined by a TSF time of a link from the multiple links of the negotiated SCS with a smallest Link ID or a largest Link ID.

In some embodiments, an AP MLD (e.g., AP MLD 104 (FIG. 1)) may allocate a medium time in a link being allowed for P2P traffic allowed through an SCS negotiation. In such an embodiment, a bandwidth of a Transmission Opportunity (TXOP) may be narrower than a maximal bandwidth determined by the SCS negotiation. As such, the medium time may be allocated according to embodiments as described herein.

In some embodiments, an AP MLD may try to allocate (some) medium time for a P2P frame exchange to a first STA (e.g., STA1) in a link (e.g., Link_1) within a service interval (e.g., a TWT SP after a TWT interval) and before the medium time is allocated to a group of links (AllocatedLinkSet) within the service interval. In an embodiment, a total medium time for each link (Link_i, where i represents a positive integer) is announced in a Medium Time field for Link_i, where the total medium time for Link_i is TotalMediumTimeUnderLink_i. In such an embodiment, a weighted medium time for Link_i is:

$$\text{TotalMediumTimeUnderLink\_1} * BW\_i \quad (1)$$

where according to equation (1), BW_i represents a bandwidth of Link_i and is announced in a Bandwidth field for Link_i. As such, a weighted allocated medium time in Link_i within the AllocatedLinkSet within the service interval is:

$$\Sigma_t \text{Time}_{i,t} * BW_{i,t} \quad (2)$$

where according to equation (2), $\text{Time}_{i,t}$ is allocated for P2P traffic under $BW_{i,t}$ in Link_i, an where t represents medium time for Link_i. As such, a required remaining medium time for STA1 in Link_1 if all remaining P2P traffic is transmitted in Link_1 under the bandwidth is:

$$\frac{\text{TotalMediumTimeUnderLink\_1} * BW\_1 * (1 - \sum_i \frac{\sum_t \text{Time}_{i,t} * BW_{i,t}}{BW\_i * \text{TotalMediumTimeUnderLink\_i}})}{BW} \quad (3)$$

where according to equation (3), a medium time (in units of 256 microseconds (μs)) when the P2P traffic is transmitted in the link identified by a Link ID field has a reference bandwidth of 20 MHz. Alternatively, the medium time (in units of 256 μs) when the P2P traffic is transmitted in the link identified by the Link ID field has a reference bandwidth that is announced in a Bandwidth field.

In some embodiments, a resource request for P2P traffic is defined by announcing information for each link when the P2P traffic can be transmitted in multiple links. As an example, the information is a link where a P2P link can be transmitted (included in a Link ID field). As another example, the information is a maximal bandwidth (in units of 20 MHz) that can be used in the link identified by the Link ID field. In such an example, if coding of a Bandwidth field is one less than the maximal bandwidth (in units of 20 MHz) that can be used in the link identified by the Link ID field, then the Bandwidth field may be changed according to equations described herein. As yet another example, a medium time (in units of 256 μs) when the P2P traffic is transmitted in the link identified by the Link ID field has a reference bandwidth of 20 MHz.

Figure 7:
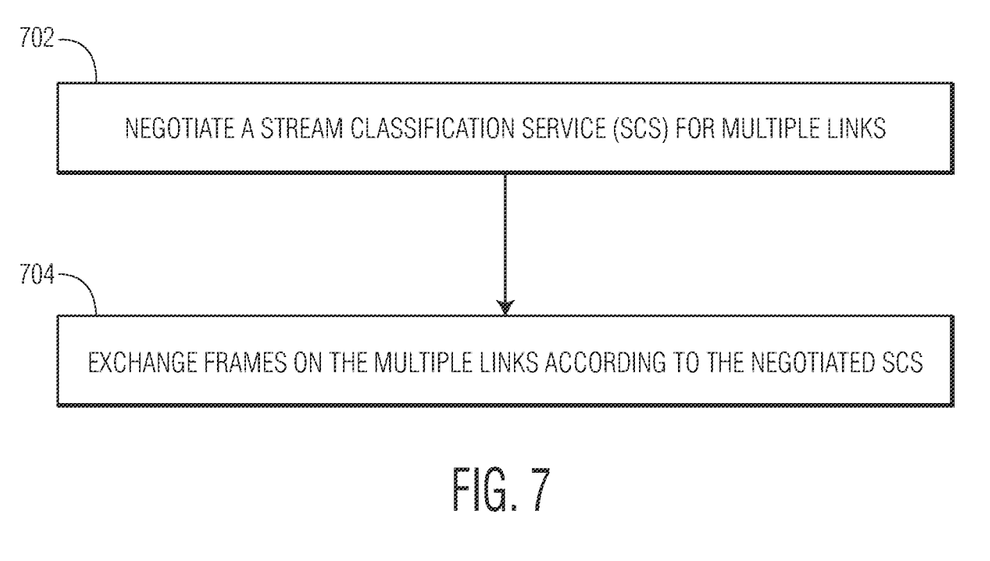
FIG. 7 illustrates a flow diagram of a technique for transmitting low latency traffic in accordance with an embodiment of the invention.

FIG. 7 illustrates a flow diagram of a technique for transmitting low latency traffic in accordance with an embodiment of the invention. At block 702, a device negotiates an SCS for multiple links. At block 704, the device exchanges frames on the multiple links according to the negotiated SCS.

In some embodiments, the technique for transmitting low latency traffic includes negotiating an SCS for multiple links, and exchanging frames on the multiple links according to the negotiated SCS.

In some embodiments, the technique for transmitting low latency traffic may be implemented by a system. For example, a system includes a first MLD configured to transmit an SCS Request frame that requests traffic characteristics indicated in a QoS Characteristics element of the SCS Request frame, and a second MLD configured to receive the SCS Request frame, and transmit an SCS Response frame that indicates whether the requested traffic characteristics were accepted, where the SCS Response frame indicates accepted traffic characteristics via a QoS Characteristics element of the SCS Response frame.

Figure 8:
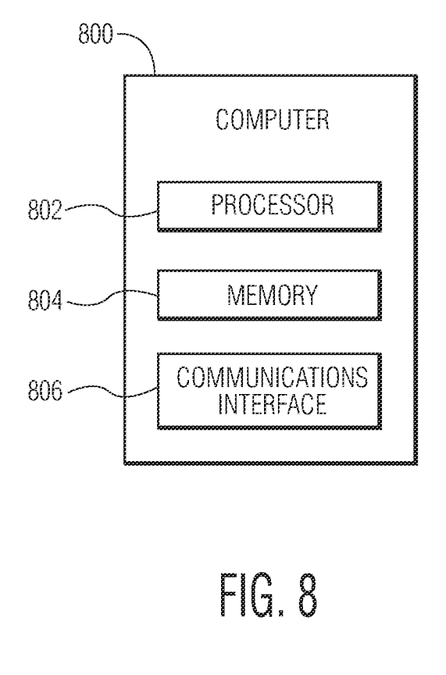
FIG. 8 depicts an example of a computer that can implement the technique for transmitting low latency traffic as described with reference to FIG. 7.

In an embodiment, the above-described functionality is performed at least in part by a computer or computers, which executes computer readable instructions. FIG. 8 depicts an example of a computer 800 that can implement the technique for transmitting low latency traffic as described herein with reference to FIG. 7. As shown, the computer 800 includes a processor 802, a memory 804, and a communications interface 806. The processor may include a multi-function processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 800 may represent an MLD (e.g., an AP MLD or a non-AP MLD). In such an example, the MLD includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a wireless network interface device implemented on one or more integrated circuits (ICs),
wherein the wireless network interface device is configured to:
negotiate a Stream Classification Service (SCS) for multiple links; and
exchange frames on the multiple links according to the negotiated SCS; and
wherein negotiation of the SCS for the multiple links includes requesting traffic characteristics via a Quality of Service (QOS) Characteristics element of an SCS Request frame, and
wherein the QoS Characteristics element indicates:
links where peer-to-peer (P2P) traffic is requested;
a medium time of the P2P traffic; and
a bandwidth of the links where the P2P traffic is requested.

2. The device of claim 1,
wherein negotiation of the SCS for the multiple links includes:
receiving an SCS Response frame that indicates whether the requested traffic characteristics were accepted; and
wherein the SCS Response frame includes a QoS Characteristics element that indicates:
links where peer-to-peer (P2P) traffic is accepted;
a medium time of the P2P traffic; and
a bandwidth of the links where the P2P traffic is accepted.

3. The device of claim 1,
wherein negotiation of the SCS for the multiple links includes:
requesting traffic characteristics via a QoS Characteristics element of an SCS Request frame; and
receiving an SCS Response frame, wherein the SCS Response frame indicates that the requested traffic characteristics were accepted.

4. The device of claim 3,
wherein the SCS Response frame indicates accepted traffic characteristics via a QoS Characteristics element of the SCS Response frame.

5. The device of claim 4,
wherein the QoS Characteristics element of the SCS Response frame indicates at least one of a link bitmap of P2P traffic for a requested link and an updated service interval.

6. The device of claim 1,
wherein negotiation of the SCS for the multiple links includes:
requesting traffic characteristics via a QoS Characteristics element of an SCS Request frame; and
receiving an SCS Response frame, wherein the SCS Response frame indicates that the requested traffic characteristics were rejected.

7. The device of claim 6,
wherein the SCS Response frame indicates suggested traffic characteristics via a QoS Characteristics element of the SCS Response frame when the requested traffic characteristics are rejected.

8. The device of claim 1,
wherein a link bitmap included in at least one of a QoS Characteristics element and an SCS Descriptor element that is transmitted during the SCS negotiation indicates links being used for negotiated traffic.

9. The device of claim 1,
wherein the device negotiates restricted Target Wake Time (rTWT) parameters in an rTWT negotiation according to the negotiated SCS.

10. The device of claim 9,
wherein a Target Wake Time (TWT) element transmitted in the rTWT negotiation includes an SCS identifier (ID) (SCSID) that indicates a traffic stream whose frames are serviced in an rTWT service period (SP).

11. The device of claim 9,
wherein a TWT element transmitted in the rTWT negotiation includes an SCS Descriptor element that indicates a traffic stream whose frames are serviced in an rTWT SP.

12. The device of claim 1,
wherein a Service Start Time is defined by a timing synchronization function (TSF) time of a link where an SCS Request frame is transmitted during the SCS negotiation.

13. The device of claim 1,
wherein a Service Start Time is defined by a link from the multiple links of the negotiated SCS with at least one of a smallest TSF time and a largest TSF time.

14. The device of claim 1,
wherein a Service Start Time is defined by a TSF time of a link from the multiple links of the negotiated SCS with at least one of a smallest Link ID and a largest Link ID.

15. The device of claim 1,
wherein the device exchanges the frames in a traffic stream, and
wherein a TWT of the traffic stream and a Service Start Time of the traffic stream are the same.

16. The device of claim 1,
wherein the device exchanges the frames in a traffic stream, and
wherein a TWT of the traffic stream is before a Service Start Time of the traffic stream.

17. The device of claim 1,
wherein the device exchanges the frames in a traffic stream, and
wherein a TWT of the traffic stream is after a Service Start Time of the traffic stream.

18. A device comprising:
a wireless network interface device implemented on one or more integrated circuits (ICs),
wherein the wireless network interface device is configured to:
    negotiate a Stream Classification Service (SCS) for multiple links; and
    exchange frames on the multiple links according to the negotiated SCS;
wherein negotiation of the SCS for the multiple links includes:
    requesting traffic characteristics via a QoS Characteristics element of an SCS Request frame; and
    receiving an SCS Response frame, wherein the SCS Response frame indicates that the requested traffic characteristics were accepted;
wherein the SCS Response frame indicates accepted traffic characteristics via a QoS Characteristics element of the SCS Response frame; and
wherein the QoS Characteristics element of the SCS Response frame indicates at least one of a link bitmap of P2P traffic for a requested link and an updated service interval.

19. A device comprising:
a wireless network interface device implemented on one or more integrated circuits (ICs),
wherein the wireless network interface device is configured to:
    negotiate a Stream Classification Service (SCS) for multiple links; and
    exchange frames on the multiple links according to the negotiated SCS; and
wherein negotiation of the SCS for the multiple links includes:
    requesting traffic characteristics via a QoS Characteristics element of an SCS Request frame; and
    receiving an SCS Response frame that indicates whether the requested traffic characteristics were accepted; and
    wherein the SCS Response frame includes a QoS Characteristics element that indicates:
    links where peer-to-peer (P2P) traffic is accepted;
    a medium time of the P2P traffic; and
    a bandwidth of the links where the P2P traffic is accepted.

* * * * *